Sept. 7, 1965  R. E. STOKELY  3,204,428
UNIVERSAL JOINT
Filed Aug. 14, 1963  2 Sheets-Sheet 1
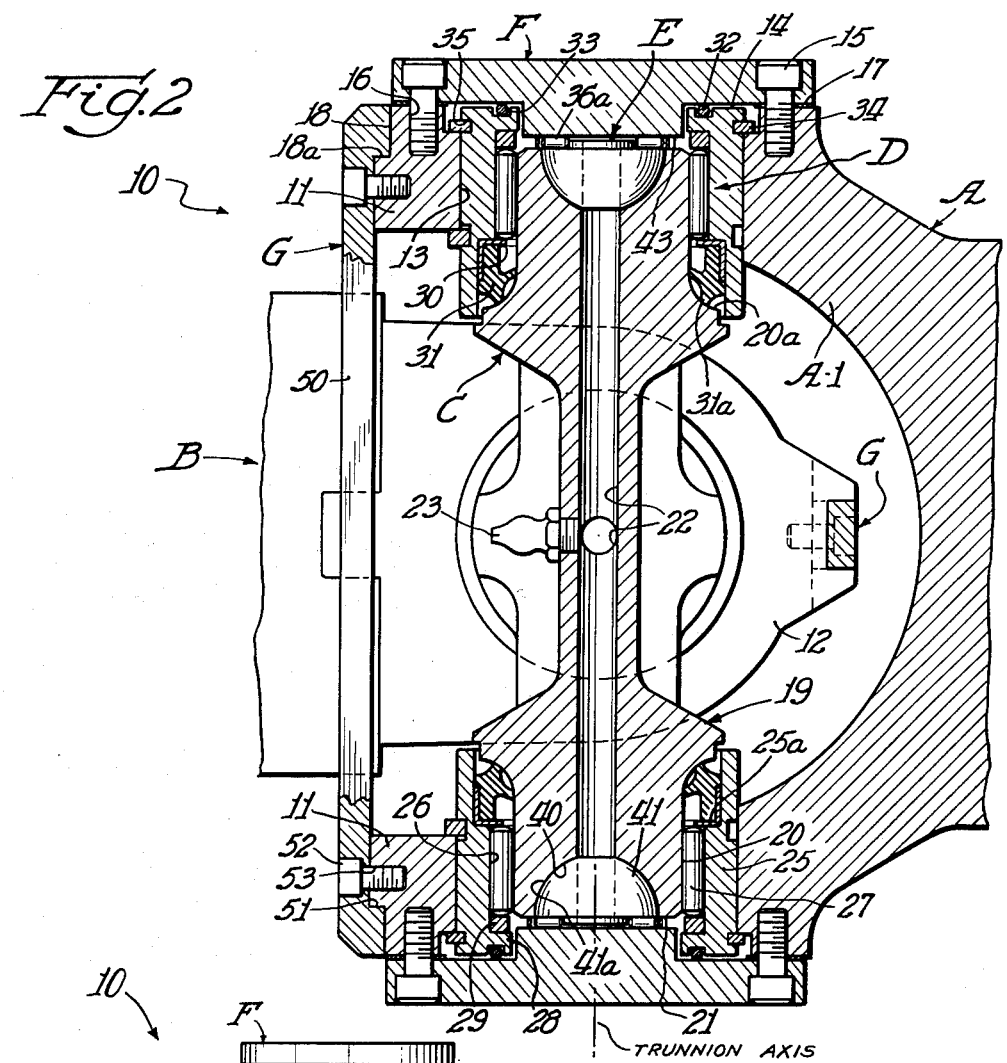
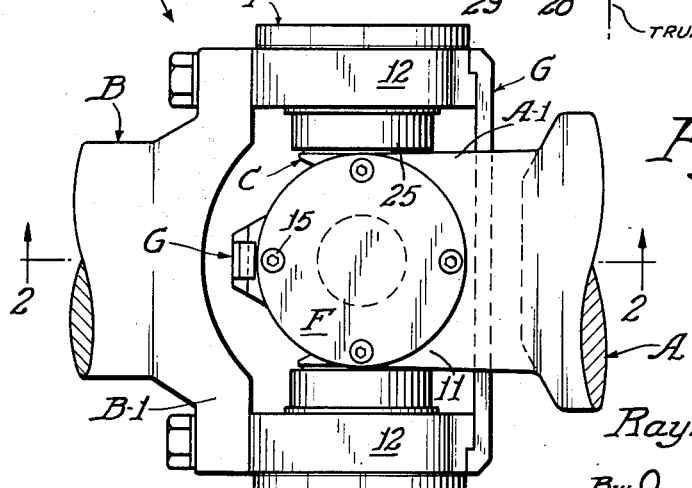
Inventor:
Raymond E. Stokely
By: Joseph W. Malleck  Atty.

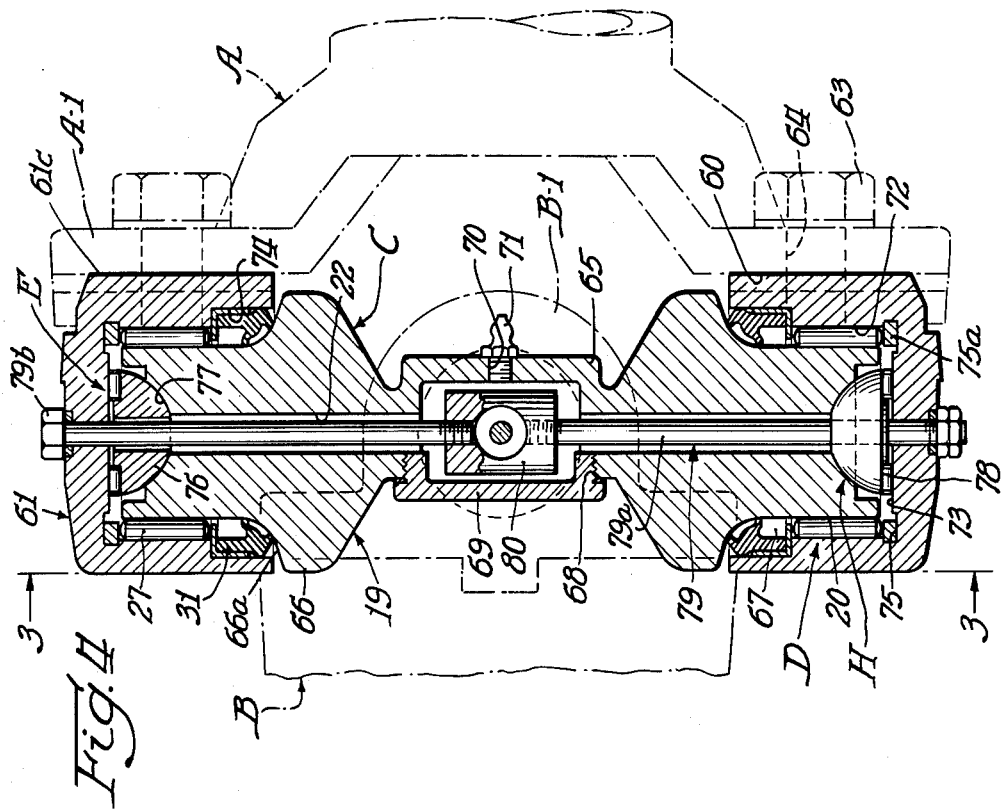
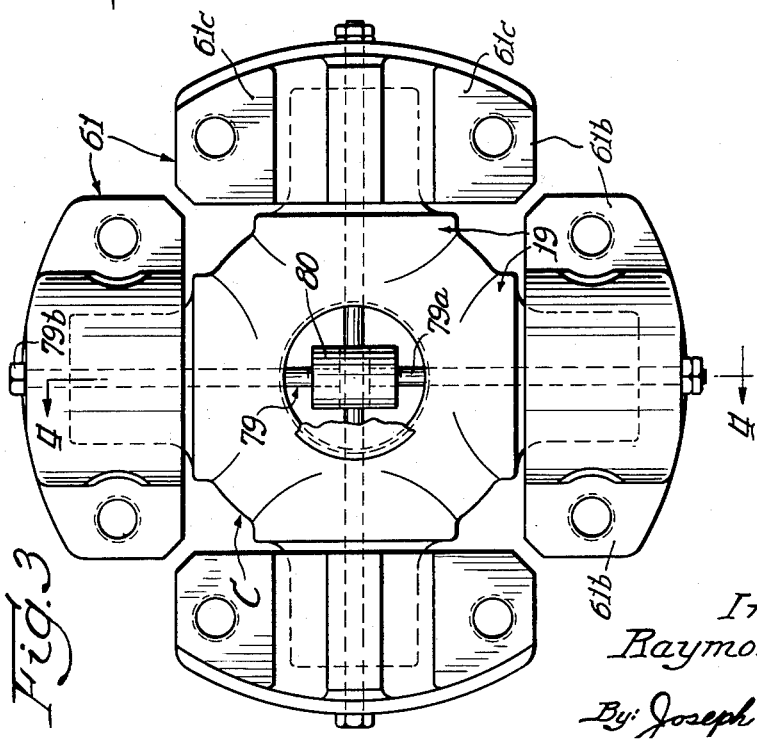

United States Patent Office 3,204,428
Patented Sept. 7, 1965

3,204,428
UNIVERSAL JOINT
Raymond E. Stokely, Rockford, Ill., assignor to Borg-Warner Corporation, Chicago, Ill., a corporation of Illinois
Filed Aug. 14, 1963, Ser. No. 302,184
2 Claims. (Cl. 64—17)

This invention relates to universal joints and particularly to universal joints wherein rotary members are connected by yoke or forked members which embrace a cross member having trunnions pivotally held therebetween. Usually there are separate roller bearings cooperating and forming each of the pivotal connections between the cross member and the yoke members; the roller bearings include a cup or socket adapted to be attached to the yoke arms and are shaped to fit over the trunnions of the cross member while entraining a plurality of roller bearings therebetween.

The torque capacity of a universal joint in part depends upon the speed of rotation, the degree of continuity of the torque and the angle in which the joint operates; however, the most important and primary factor is the load capacity of the trunnion bearings with which this invention is concerned. If the connected input and output shafts of the joint are nearly in line, there is little motion at the bearings and power loss and heat generation are small, whereas the reverse is the case if the joint works at large angles. In modern day automobile applications joints must be able to work at relatively larger angles and at higher speeds than experienced heretofore.

To increase the torque capacity of the joints, needle bearings have been employed between the cup (serving as the outer race) and the trunnion end (serving as the inner race). It is important that these needle bearings do equal work and all contact the trunnion end so as to take their share of the load. However, under present day practices of machining the surfaces of the trunnion and cup inner wall, there may be a certain amount of out-of-squareness in manufacturing as well as flexure of the bearings and yokes during operation due to centrifugal forces and load. Even a slight amount of misalignment will cause galling of certain of the rollers and eventual failure of the joint.

Another effect resulting from certain of the needle bearings not contacting both races occurs when the bearing cups are drawn outwardly by high centrifugal forces providing a clearance between the inner washer normally locating the inner ends of the needle bearings. It is important that all the needle bearings be maintained in contact with the inner and outer races as well as the inner and outer thrust washers during operation. The bearings should be prevented from deflecting outwardly radially leaving the above-mentioned clearance which results in a hammering effect on the surfaces when the input and output shafts go through periods of vibration, leading to galling of the ends of the trunnions and bearings in a matter of a few minutes of high speed operation.

Heretofore the above problems of alignment have been attacked by providing the yoke or bifurcations with a keyway extending in a radial direction thereof and interfitting with a groove of the yoke; this construction tends to maintain radial alignment of the bearing cups with respect to the axis of rotation of the trunnions. In addition, a circular flange has usually been machined at the outer ends of the yokes adapted to overlay the outer surfaces of the bearing cups so as to act as stops and limit radially outward movement of the bearing cups during high centrifugal force conditions. However, each of these structural features have permitted a limited amount of misalignment due to manufacturing inadequacies and the natural deflection of the material during operation.

It is a primary object of this invention to provide a universal joint device not subject to the above inadequacies.

It is another object of this invention to provide a universal joint wherein the roller bearings are adapted to maintain full bearing contact with the inner and outer races of the joint during all conditions of operation.

It is another object of this invention to provide a universal joint which has structural features which compensate for normal out-of-squareness of the bearing cups with respect to the trunnions resulting from manufacturing tolerances and material deflection during operation of the joint.

Another object of this invention is to provide a universal joint of the yoke and trunnion cross type in which positive tie means, disposed internally or externally of the cross, are utilized to maintain a predetermined spaced relation between arms of each yoke or between oppositely facing bearings supported on said yoke arms.

A more particular object is the provision of a universal joint of the yoke and cross type in which a rigid external bar is adapted to lock opposite arms of each yoke together and prevent yielding due to centrifugal forces; the cross also is adapted for self-alignment with respect to the yoke by a centering means comprising a female socket portion formed on the end of each cross trunnion and disposed concentrically about the trunnion axis, a male portion of semi-spherical shape is adapted to mate with the female portion as urged by a closure cap secured to the yoke and thereby insure said alignment.

It is still another object of this invention to provide a universal joint having a unique bearing assembly with means extending centrally through opposite trunnions thereof providing a positive compression force between the trunnions and the bearing cups, and adapted to self-align the bearing cup with respect to the central axis of the respective trunnion.

Still another object of this invention is to provide a universal joint in accordance with the preceding objects in which the compression means is adjusted by internal access to the central portion of the trunnion cross wherein a coupler is disposed.

This invention consists of a novel construction, arrangement and device to be hereinafter described and claimed for carrying out the above-stated objectives and such other objects as will be apparent from the following description of a preferred form of this invention and illustrated with reference to the accompanying drawings:

FIG. 1 is a substantial central sectional view of a universal joint embodying the principles of this invention;

FIG. 2 is a view taken substantially along line 2—2 of FIG. 1;

FIG. 3 is an elevational view taken along line 3—3 of FIG. 4 of a universal joint embodying an alternative construction of this invention and having portions thereof broken away; and FIG. 4 is a sectional view taken substantially along line 4—4 of FIG. 3 and showing certain portions thereof in schematic outline.

Referring now to the drawings, and particularly to FIGS. 1 and 2 wherein is shown a preferred embodiment of this invention comprising a universal joint generally indicated 10, having rotary input and output members A and B respectively, each having a yoke or forked portion A-1 and B-1 respectively. The forked portions are adapted to receive oppositely extending trunnion portions of a cross member C. Bearing assembly means D is interposed between each of the trunnion portions of the member C and the arms of the forked portions to permit relative rotary movement therebetween. A self-centering means E is provided between the trunnion portions of the cross member C and a closure cup F which is provided to cover each of the forked portion arms and bearing assemblies and comprises female and male elements which will be further detailed hereinafter. A positive tie means G extends between opposed arms of each yoke and are adapted to provide a lock for maintaining a predetermined spaced relation between the forked portion arms even during high speed operation. The centering means E and positive tie means G form particular features of this invention.

Turning now in more particularity to the construction of the joint, the input and output rotary members A and B each have forked portions A–1 and B–1 formed with a pair of arms 11 and 12 respectively; the arms of each forked portion extend generally parallel to each other at a predetermined spaced distance taken in a diametrical direction with respect to the input and output members. The arms of each yoke are provided with a central opening 13 having their center lying on the axis of the received trunnion portion.

The outwardly disposed surface 14 of each of the arms is generally flat; each surface 14 is adapted to receive the closure cup F secured thereon by fasteners 15 threadably received in openings 16 equally spaced about the flat surface 14. A suitable gasket 17 is used to seal up the closure between the cup F and the arms 11 and 12. The outer portion of each arm 11 and 12 has formed thereon a recess 18 carrying a locking surface 18a which is adapted to face radially outwardly with respect to the device.

The cross member C has four trunnion portions all lying in a common plane and extending outwardly at 90° angles relative to each other. Each trunnion portion 19 has a highly machined cylindrical surface 20 formed at the end thereof. The outer end of each trunnion portion has a flat surface 21 formed thereat and is disposed generally perpendicular to the associated trunnion axis. Lubrication conduits 22 are formed throughout the trunnion portions and extend into the central area of the cross; the lubrication conduits are disposed generally concentrically of the trunnion axis and terminate at a lubrication nipple 23.

The bearing assembly means D comprises an outer ring or race 25 which is of a circular cylindrical configuration and is fitted within each of the openings 13 formed in the forked portion arms. Disposed between the cylindrical surface 20 of each trunnion portion and an inner cylindrical surface 26 of each outer race 25 is a plurality of roller or needle bearings 27. The needle bearings are entrained against radially outward movement along the trunnion portion surface 20 by flange 28 formed at the outer end of each race 25 and extending radially inwardly with respect to the race. Disposed inwardly and embraced by said flange 28 is a thrust ring 29 comprised of suitable material such as metal. At the radially inner extent of each needle bearing is disposed an annular ring 30 which is adapted to snugly fit within a stepped portion 25a of the race 25 to serve as an inner abutment. The ring 30 forms an integral part of the seal 31 which is comprised of rubber and bonded to the ring 30. The seal 31 is of a type disclosed and claimed in my copending application S.N. 302,165 filed August 14, 1963. The lips 31a of the seal engage the outwardly flared portion 20a of the trunnion surface 20 and transmit a reaction to the ring 30 performing a radial inner stop. Suitable seals 32 are disposed in appropriate grooves 33 to form a fluid seal between the closure cup and the race 25. Snap rings 34 are disposed in suitable grooves 35 in the outer spherical side of the race 25 and are adapted to secure the race against radial movement with respect to the forked portions A–1 and B–1.

The centering means E comprises a female socket portion 40 having a semi-spherical surface configuration and disposed concentrically about the axis of the trunnion portion. There is a centering means E provided for each of the trunnion portions and arm assemblies. A male element 41 having a mating surface 41a with the female socket 40 is adapted to be inserted in the socket and urged into tight contact therewith by a central shoulder 43 depending from the closure cup F. A thrust ring having a plurality of rollers 36a entrained therein is disposed between the closure cup shoulder 45 and is adapted to transmit force between the closure cup and the male element. The thrust ring is centered on the male element and has an upstanding shoulder which fits within the central portion of the thrust ring.

Tie-means G is provided to prevent the forked portion arms from deflecting outwardly under centrifugal forces and thereby distort the alignment between the bearing and the trunnion portions. The tie-means G comprises an elongated bar 50 adapted to extend between the arms of each forked portion. The outer ends of each bar 50 has shoulders 51 formed thereon adapted to interlock with the surfaces 18a on the opposed arms of each forked portion. Suitable fasteners such as cap screws 52 are adapted to be threadably received in openings 53 formed in the side of each arm 11 and 12.

Referring now to FIGS. 3 and 4, wherein is shown an alternative embodiment of this invention, parts similar to the preferred embodiment have similar reference characters.

The input and output members A and B have bifurcated portions A–1 and B–1 each provided with closely machined surface 60 adapted to mate with a side 61c of one of the bearing cups 61; the bearing cups are joined thereto by fasteners 63 extending through openings 64 in the bifurcated portions and the wings 61b of each cup.

The cross member C is formed with four equally angularly spaced cylindrical trunnion portions 19 arms lying within a common plane, each arm having a highly machined cylindrical trunnion surface 20 at its outer radial end and its inner portion integrally formed with a central throat 65. Intermediate the throat 65 and the outer trunnion portion 19, each arm has formed thereon an enlarged annular shoulder 66 with a gradually curved side 65 thereof and adapted to cooperate in forming one side of a pocket 67 in cooperation with the bearing cups 61, thereby entraining a plurality of needle bearings 27 therebetween. The throat portion has a hollow cylindrical interior with an opening 68 formed one side thereof and extending in an axial direction of the universal joint. A cup 69 is adapted to be threadably received by the walls of said opening 68 and provide ready access to the interior of said throat 65. An oil port 70 having a nipple 71 attached thereto is provided to enable internal pressure lubrication of the bearing means E by way of central borings 22 extending through the cross arms and communicating with the pockets 67.

The bearing means E particularly comprises cups 61 each having a hollow cup interior formed by surfaces 72 and 73 and opening radially inwardly of the device. An interior annular groove 74 is formed in the inner surface of the cup to accommodate an annular bearing seal 31 between the trunnion portion 19 and the cup 61 which is particularly adapted for high speed operation.

The cupped interior also is provided with an annular groove 75 to accommodate a metallic thrust washer 76; the washer 76 and seal 31 act as axial bearings for maintaining the needle bearings 27 in place. The needle bearings 27 are disposed between the outer surface 20 of the trunnion portions (serving as the inner race) and the inner cylindrical wall 26 of the cup interior (serving as the outer race of the bearing).

An important feature of this invention is the provision of self-aligning retention means H adapted to maintain the proper spaced integrity between the trunnion portions 19 and the bearing cups 61. To maintain concentric alignment, the retention means H comprises male and female portions 76 and 77 respectively. Female portion 77 comprises a semi-spherical socket formed on the outer end of each trunnion portion 19 and is centered about the axis of the trunnion portion. The male element 76 comprises a semi-spherical insert adapted to mate with the female socket and is disposed between the bearing cup 61 and the end of the trunnion portion so as to transfer compressive stresses of the cup to the trunnion portion and maintain a centering effect. The male element has an annular groove 78 at the outer periphery thereof for receiving a Delrin thrust washer roller bearing therein; the thrust bearing permits antifriction transfer of forces between the surface 73 of the bearing cup and the male element.

To maintain the proper radial spaced relationship of the bearing cup and trunnion portions even during high speed operation where centrifugal forces tend to cause distortion, the retention means H further comprises tie-rod means 79 having a rod 79a extending through each of the borings 22 in the trunnion portions and are coupled within the interior of the throat 65 by a coupler 80. The coupler threadably receives said rods so that they may be adjusted to apply a variable compressive stress by way of their heads 79b to the bearing cup 61.

In this latter embodiment the positive retention means are substantially enclosed within the cross member C and are adapted to provide a more centralized safety factor against mis-alignment during operation.

While I have described my invention in connection with a certain specific construction and arrangement, it is to be understood that this is by way of illustration and not by way of limitation, that the scope of my invention is defined solely by the appended claims which should be construed as broadly as the prior art will permit.

I claim:

1. A universal joint comprising: rotary input and output members each having forked portions carrying arms spaced apart a predetermined distance, said arms of each forked portion having annular openings therein with centers on a common axis, said arms of each yoke having a pair of opposed outwardly facing locking surfaces, a cross member having trunnion portions adapted to be received within the openings of said arms, bearing means received in each said opening of said arms comprising an annular outer race and a plurality of roller bearings disposed between said race and said trunnion portions, a closure cap fitting over each of said arm openings and having a central portion adapted to extend into the bearing race, centering means adapted to align said trunnion portions with said arms comprising a female socket formed in the outer end of each said trunnion portion concentric about the axis thereof and a semi-spherical male member interposed between said closure cap and said trunnion portions and adapted to mate with said female socket, thrust bearing means disposed between said closure cap and said trunnion portion adapted to permit relative rotary movement therebetween, and positive tie means extending between oppositely disposed arms of each forked portion and having surfaces adapted to lock with said locking surfaces of said arms whereby arms are restrained against deflection under high centrifugal forces.

2. A universal joint comprising: rotary input and output members each having forked portions, a cross member having trunnion portions, bearing means adapted to interconnect said trunnion portions with the ends of said forked portions and permit relative rotary movement therebetween about an axis of the trunnion portion, said bearing means comprising a cup rigidly carried by each of said forked portions and effective to surround a trunnion portion, self-aligning retention means including a tapered female socket formed on the outer end of at least two oppositely facing trunnions and each socket facing radially outwardly with respect to the joint, male inserts disposed between said bearing means and said oppositely facing trunnion ends adapted to mate with said female socket and having a flat outer face, said male and female portions being concentric with the axis of said trunnion portions, thrust bearing means interposed between said flat face of said male inserts and the cup associated with each trunnion portion and having a plurality of annularly arranged rollers effective to transmit thrust therebetween and laterally adjust said cup on said flat surface of said male inserts, compression means extending between and into opposite bearing cups and passing through said male insert and female socket and effective to urge said male inserts more tightly with said female socket whereby the bearing means are maintained in accurate radial and concentric relationship with the trunnion portions during all conditions of operation.

References Cited by the Examiner

UNITED STATES PATENTS

| | | |
|---|---|---|
| 1,943,814 | 1/34 | Cutting. |
| 2,024,410 | 12/35 | Williams. |
| 2,026,997 | 1/36 | Rice. |
| 2,081,505 | 5/37 | Padgett. |
| 2,107,497 | 2/38 | Padgett _____ 64—17 |

FOREIGN PATENTS

| | | |
|---|---|---|
| 219,828 | 8/24 | Great Britain. |

ROBERT C. RIORDON, *Primary Examiner.*